United States Patent [19]

Sawyer et al.

[11] Patent Number: 4,932,206
[45] Date of Patent: Jun. 12, 1990

[54] GUIDE VANE ASSEMBLY FOR AUXILIARY POWER UNIT

[75] Inventors: Ken W. Sawyer; Roy W. Vershure, Jr., both of Escondido, Calif.

[73] Assignee: Sundstrand Corporation, Rockford, Ill.

[21] Appl. No.: 232,958

[22] Filed: Aug. 17, 1988

[51] Int. Cl.⁵ .............................................. F02C 7/042
[52] U.S. Cl. .................................... 60/39.23; 415/160
[58] Field of Search ............... 60/39.23; 415/159, 160, 415/161, 162, 163, 164, 151

[56] References Cited

U.S. PATENT DOCUMENTS

| | | | |
|---|---|---|---|
| 2,805,818 | 9/1957 | Ferri | 415/160 |
| 2,914,241 | 11/1959 | Novak | 415/162 |
| 3,352,537 | 11/1967 | Petrie | 415/160 |
| 3,779,666 | 12/1973 | Snell . | |
| 3,804,550 | 4/1974 | Lewis . | |
| 4,219,305 | 8/1980 | Mount et al. . | |
| 4,428,714 | 1/1984 | Mowill . | |
| 4,439,104 | 3/1984 | Edmonds . | |
| 4,627,234 | 12/1986 | Schuh . | |

FOREIGN PATENT DOCUMENTS

| | | | |
|---|---|---|---|
| 1022637 | 3/1953 | France | 416/160 |
| 500965 | 2/1939 | United Kingdom | 416/160 |
| 701505 | 12/1953 | United Kingdom | 416/160 |
| 785092 | 10/1957 | United Kingdom | 415/160 |
| 913147 | 12/1962 | United Kingdom | 415/160 |

*Primary Examiner*—Louis J. Casaregola
*Attorney, Agent, or Firm*—Wood, Phillips, Mason, Recktenwald & VanSanten

[57] ABSTRACT

A guide vane assembly for controllably varying fluid mass flow rates past compressor blades in an auxiliary power unit. The auxiliary power unit comprises a rotary apparatus for compressing fluid in a compressor housing wherein a plurality of compressor blades are mounted on a rotating hub. A fluid flow path extends through the housing which has a duct portion extending upstream of the compressor blades to an inlet plenum to define at least a portion of the fluid flow path. The guide vane assembly includes a central gear box adjacent the compressor housing which has a ring gear mounted for limited rotational movement. A plurality of guide vanes are disposed in the duct portion of the housing and are mounted for pivotal movement responsive to rotational movement of the ring gear. The guide vane assembly is adapted to convert rotation of the ring gear to pivotal movement of the guide vanes. The auxiliary power unit includes a worm gear for driving the ring gear to cause the limited rotational movement producing the pivotal movement of the guide vanes. With this arrangement, the central gear box completely seals all of the operating components including the ring gear and the worm gear in a lubricated environment isolated from ambient conditions.

15 Claims, 2 Drawing Sheets

GUIDE VANE ASSEMBLY FOR AUXILIARY POWER UNIT

FIELD OF THE INVENTION

The present invention relates to a rotary apparatus for compressing fluid in a compressor housing and, more particularly, to a guide vane assembly for controllably varying fluid mass flow rates in an auxiliary power unit.

BACKGROUND OF THE INVENTION

A number of auxiliary power units in service today have variable inlet guide vanes in the compressor inlet to vary air flow throughout the operating envelope to maintain surge-free, stable operation. In service, performance deterioration often occurs due to ingestion of dirt and other debris into the inlet which can result in performance losses running as high as four percent per one thousand hours of operation without maintenance or cleaning. Debris rapidly collects in the variable inlet guide vane actuator mechanism which will cause the mechanism to eventually jam thus rendering it totally inoperative.

As will be appreciated, this failure mode often becomes a major reason for premature removal of the auxiliary power unit well before the other portions of the unit should require service or maintenance.

Also, high power density in military weapons systems mandates that auxiliary power units be designed to be as small in volume as possible, i.e., it is critical to design such auxiliary power units to have minimum diameter and length dimensions. In other words, space restrictions in military weapons systems coupled with high power density requirements render auxiliary power unit design especially critical to avoid compromising performance characteristics while maintaining mechanical integrity.

For these reasons, it would be desirable to be able to house the operable components within the available inlet area of an auxiliary power unit. Structural rigidity and load path of the assembly should at the same time ideally be rendered sufficient to make it possible to house the gear drive mechanism for the variable inlet guide vanes so as to be completely removed from the air flow path and neatly housed in an oil lubricated gear box. By so doing, both the gears and guide vanes could then be successfully fabricated of nylon or another lightweight composite material.

If this were achieved, the guide vanes would then have excellent lubricity characteristics as well as very low adhesion to thereby minimize debris accumulation and performance losses. This would also make it possible to provide not only a very lightweight assembly but also one having structurally sound components with a long life span and no propensity for seizing and/or failing in service. Furthermore, it would be desirable to fabricate other components from composite material to allow for performance optimization with better control over compressor clearances within the allowable inlet space.

The present invention is directed to overcoming the above stated problems and accomplishing the stated objects by providing a guide vane assembly for controllably varying fluid mass flow rates in an auxiliary power unit.

SUMMARY OF THE INVENTION

Accordingly, the present invention is directed to a rotary apparatus for compressing fluid in a compressor housing wherein a plurality of compressor blades are mounted on a rotating hub. A fluid flow path extends through the housing which has a duct portion extending upstream of the compressor blades to an inlet plenum to define at least a portion of the fluid flow path. The rotary apparatus includes an integrated inlet guide vane assembly for controllably varying the fluid mass flow rate past the compressor blades. A central gear box is provided adjacent the compressor housing and contains a ring gear mounted for limited rotational movement with the guide vane assembly including a plurality of guide vanes disposed in the duct portion of the housing, each of which is mounted for movement responsive to rotational movement of the ring gear. The rotary apparatus further includes means for converting rotational movement of the ring gear to pivotal movement of the guide vanes together with means for driving the ring gear to cause the limited rotational movement thereof. The central gear box completely seals the ring gear, movement converting means and gear driving means in a lubricated environment isolated from ambient conditions. With this arrangement, the rotary apparatus is suitably an auxiliary power unit utilizing the guide vane assembly to control fluid flow to a combustor.

In an exemplary embodiment, the central gear box includes an internal flange and the ring gear includes a plurality of circumferentially extending slots. The ring gear is mounted for limited rotational movement by a plurality of mounting pins extending from the flange to protrude through the slots in the ring gear. The converting means includes a vane gear disposed internally of the gear box on a shaft supporting each of the guide vanes. With this arrangement, the shafts preferably extend from the gear box into the duct portion of the housing with the ring gear in driving engagement with all of the vane gears.

Preferably, the driving means includes a worm gear which is interconnected with means for rotatably driving the worm gear such that the worm gear can be disposed for driving engagement with the ring gear. The ring gear then will have a first set of gear teeth in engagement with corresponding gear teeth on the worm gear and will also include a second set of gear teeth for engagement with corresponding gear teeth on the vane gear carried by the shaft supporting each of the guide vanes. As will be appreciated, the vane gears comprise the means for converting limited rotational movement of the ring gear to pivotal movement of the guide vanes.

In a preferred embodiment, the guide vanes are each journaled into the gear box for pivotal movement about the respective vane supporting shafts. The guide vanes then extend radially from the respective shafts in a direction generally downstream of the inlet plenum and are pivotable into the fluid flow path to vary the cross sectional area of the duct portion. With this arrangement, a fixed strut is provided to extend across the duct portion immediately upstream of each of the vane supporting shafts.

Other objects, advantages and features of the present invention will become apparent from the following specification taken in conjunction with the accompanying drawings.

DETAILED DESCRIPTION OF THE PREFERRED EMBODIMENT

Figure 1:
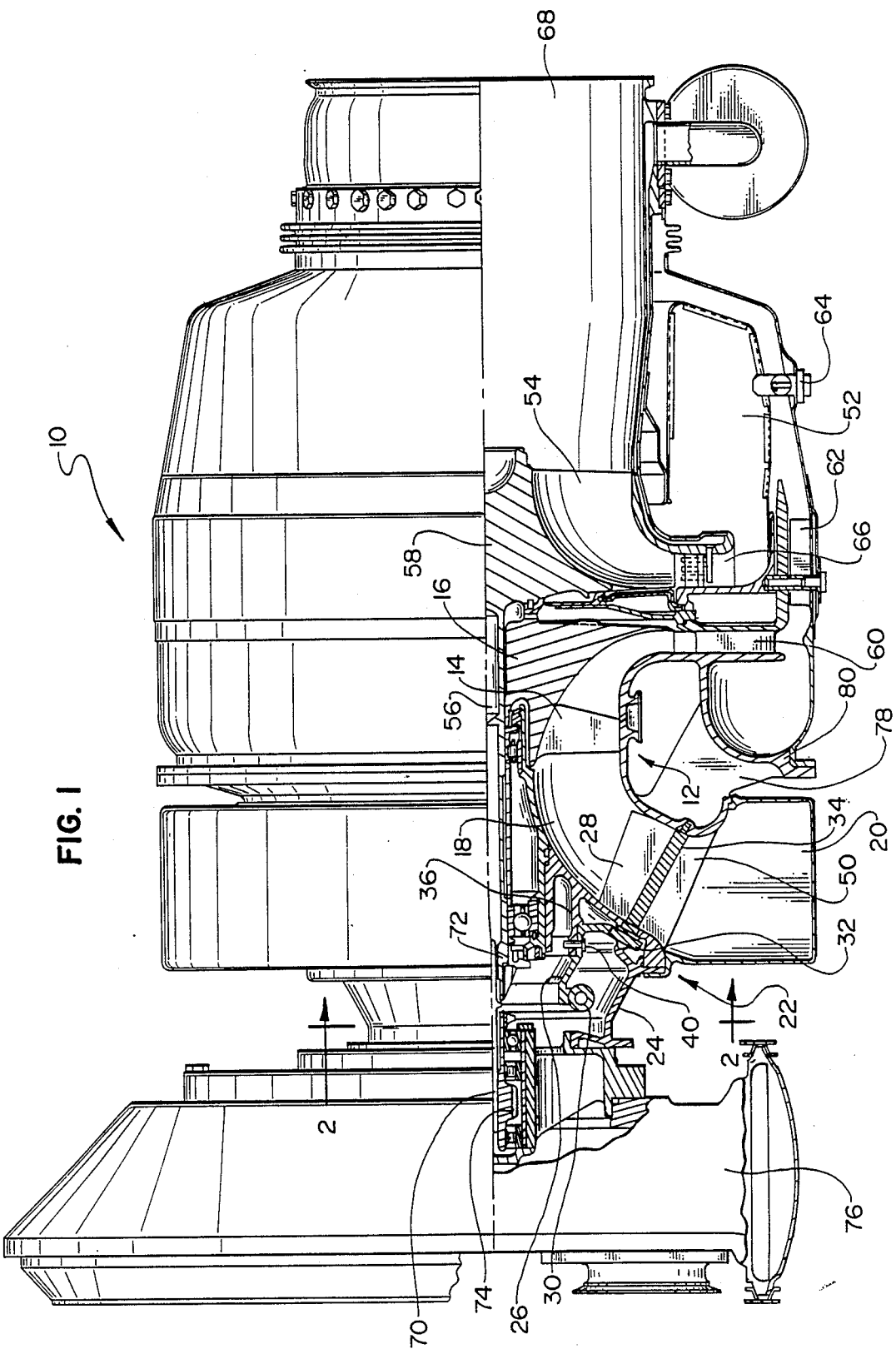
FIG. 1 is a side elevational view, partially in section, illustrating an auxiliary power unit embodying the present invention.

Referring to the drawings, and first to FIG. 1, the reference numeral 10 designates generally a rotary apparatus for compressing fluid in a compressor housing 12 wherein a plurality of compressor blades 14 are mounted on a rotating hub 16. A flow path for a compressible fluid extends through the housing 12 which has a duct portion 18 extending upstream of the compressor blades 14 to an inlet plenum 20 to define at least a portion of the fluid flow path. The rotary apparatus 10 includes an integrated inlet guide vane assembly generally designated 22 for controllably varying the fluid mass flow rate past the compressor blades 14. A central gear box 24 is provided adjacent the compressor housing 12 and contains a ring gear 26 mounted for limited rotational movement with the guide vane assembly 22 including a plurality of guide vanes 28 disposed in the duct portion 18 of the housing 12, each of which is mounted for movement responsive to rotational movement of the ring gear 26. The rotary apparatus 10 also includes a worm gear 30 which comprises means for driving the ring gear 26 to cause the limited rotational movement producing pivotal movement of the guide vanes 28. In this connection, the rotary apparatus 10 is provided with means for converting rotational movement of the ring gear 26 to pivotal movement of the guide vanes 28 as will be described in greater detail hereinafter.

Figure 2:
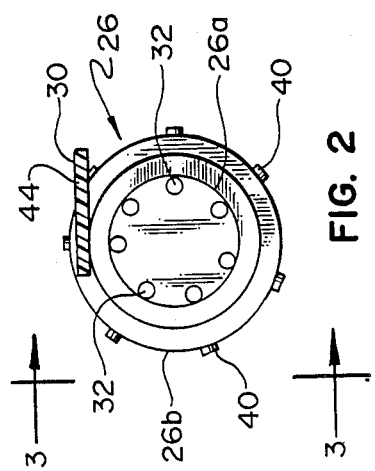
FIG. 2 is a cross sectional view taken on the line 2—2 of FIG. 1.

Still referring to FIG. 1, the central gear box 24 completely seals the ring gear 26, movement converting means, and Worm drive gear 30 in a lubricated environment isolated from ambient conditions. The movement converting means includes a vane gear 32 (see also, FIGS. 2 and 3) disposed internally of the gear box 24 on each of shafts 34 supporting each of the guide vanes 28. As shown, the shafts 34 extend from the gear box 24 into the duct portion 18 of the housing 12 whereby the ring gear 26 is formed to have a gear portion 26a in engagement with each of the vane gears 32.

Figure 3:
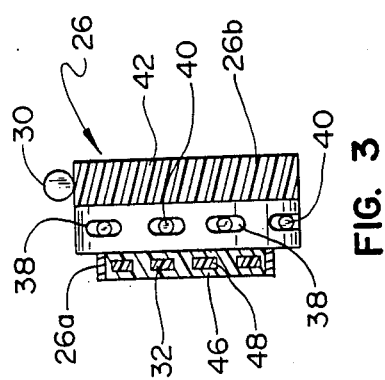
FIG. 3 is a cross sectional view taken on the line 3—3 of FIG. 2.

As shown in FIG. 1, the central gear box 24 is formed so as to have an internal flange 36 and the ring gear 26 includes a plurality of circumferentially extending slots 38 (see FIG. 3). With this arrangement, the ring gear 26 is mounted for limited rotational movement by means of a plurality of mounting pins 40 extending from the internal flange 36 to protrude through the slots 38 in the ring gear 26.

As previously mentioned, the driving means comprises the worm gear 30 which is in engagement with the ring gear 26. Specifically, the ring gear 26 has a first set of gear teeth as at 42 on a gear portion 26b which are in engagement with corresponding gear teeth 44 on the worm gear 30 and it also has a second set of gear teeth 46 on the gear portion 26a for engagement with corresponding gear teeth 48 on each of the vane gears 32 carried by the respective shafts 34 supporting each of the guide vanes 28. As will be appreciated, the vane gears 32 comprise means for converting limited rotational movement of the ring gear 26 to pivotal movement of the guide vanes 28.

Referring specifically to FIG. 1, the guide vanes 28 are each journaled into the gear box 24 on one of the vane supporting shafts 34. The guide vanes 28 extend radially from the respective shafts 34 in a direction generally downstream of the inlet plenum 20 and are pivotable into the fluid flow path to vary the effective cross sectional area of the duct portion 18. As also shown, a fixed strut 50 extends across the duct portion 18 immediately upstream of each of the vane supporting shafts 34.

With the arrangement described, the vane gears 32, ring gear 26 and worm gear 30 are all disposed entirely within the gear box 24. It will be understood that the gear box 24 thus completely seals these components in a lubricated environment entirely isolated from ambient conditions where dirt and debris might otherwise interfere with operation of the guide vane assembly 22 to cause performance losses and/or jamming or sticking of the variable inlet guide vanes 28 at a premature point before normally required maintenance and/or cleaning. As a result, the rotary apparatus 10 is far less susceptible to a failure mode which could become a major reason for premature removal of the apparatus.

As will now be appreciated, the guide vanes 28 extend radially from the respective shafts 34 in a direction generally downstream toward the compressor blades 14. They are, as described, pivotable into the path of fluid flow from the inlet plenum 20 through the duct portion 18 and toward the compressor blades 14 to not only vary the cross sectional area of the duct portion 18 but to thereby vary the fluid mass flow rate into the area of the compressor housing 12 bearing the compressor blades 14. By reason of isolating the components utilized to drive the guide vanes 28 in the gear box 24, it is possible to significantly reduce any chance of a failure mode by reason of dirt and/or debris.

In one particularly advantageous application of the present invention, the rotary apparatus 10 comprises an auxiliary power unit. The auxiliary power unit includes an annular combustor 52 for driving turbine blades 54 to impart rotational movement to a shaft 56 by means of a rotating hub 58 which is integral with both the turbine blades 54 and the shaft 56. As shown, the auxiliary power unit 10 will typically include a diffuser 60 and swirl control blades 62 disposed between the annular compressor housing 12 and the annular combustor 62.

In this particular application of the present invention, it will be seen that the rotating hub 16 is driven by the shaft 56. This, in turn, drives the compressor blades 14 to compress the air entering at the inlet plenum 20 and following the fluid flow path through the duct portion 18 toward the compressor blades 14 after which the compressed air passes through the diffuser 60 and the swirl control blades 62 to the annular combustor 52. By varying the position of the guide vanes 28, it is possible to controllably vary the fluid mass flow rate to the combustor 52.

Still referring to FIG. 1, the annular combustor 52 may include a plurality of circumferentially spaced fluid injectors 64 and a nozzle 66 leading to the turbine blades 54. After passing through the nozzle 66, the fuel/air mixture that has burned in the combustor 52 drives the turbine blades 54 to, thus, drive the shaft 56 through the rotating hub 58 and then passes through the exhaust duct 68.

In the embodiment illustrated in FIG. 1, the shaft 56 drives a quill shaft 70 at a power take-off point as at 72 and the quill shaft 70 is provided near its opposite end with an internal drive gear 74. With this arrangement, the internal drive gear 74 can be utilized to drive, e.g., a scavenge pump, generator, fuel pump, hydraulic pump motor, etc., provided in the auxiliary power unit housing 76.

With the annular arrangement illustrated in FIG. 1, the compressor housing 12, duct portion 18, inlet plenum 20, vane assembly 22, gear box 24, internal flange 36, combustor 52 and exhaust portion 68 are all annular components. It will be noted that these components are disposed such that the inlet plenum 20 extends radially outward as far as any of the other components i.e., the other components are all substantially contained within the envelope defined by the inlet plenum 20. Moreover, by reason of the fixed struts 50, in cooperation with external struts 78, the load paths of the assembly extends from the gear box 24 straight across the inlet plenum 20 to the diffuser housing 80 to provide structural rigidity.

As should now be appreciated, the gear drive mechanism for the guide vane assembly 22 is neatly housed in the oil lubricated gear box 24 where it is completely removed from the air flow path. This allows the gears 26, 30 and 32, the guide vanes 28 and the inlet struts 50 to all be formed of nylon or another lightweight composite material having excellent lubricity characteristics, and an extremely smooth surface finish with very low adhesion thereby minimizing debris accumulation and performance losses while providing a very lightweight and structurally sound, long life assembly. Moreover, the assembly has no propensity for seizing and/or failing in service while providing performance optimization with better control over compressor clearances together with weight reduction within the allowable inlet area.

While in the foregoing there has been set forth a preferred embodiment of the invention, it is to be understood that the invention is only to be limited by the spirit and scope of the appended claims.

We claim:

1. In a rotary apparatus for compressing fluid in a compressor housing wherein a plurality of compressor blades are mounted on a rotating hub, a compressible fluid flow path extending through the housing, the housing having a duct portion extending upstream of the compressor blades to an inlet plenum to define at least a portion of the fluid flow path extending therethrough, the improvement comprising:

an integrated inlet guide vane assembly for controllably varying the fluid mass flow rate past the compressor blades, the guide vane assembly including a central gear box adjacent the compressor housing, the gear box having a ring gear mounted for limited rotational movement, the guide vane assembly also including a plurality of guide vanes disposed in the duct portion of the housing, the guide vanes each being mounted for pivotal movement responsive to rotational movement of the ring gear, the guide vane assembly further including means for converting rotational movement of the ring gear to pivotal movement of the guide vanes;

means supporting a plurality of mounting pins in the central gear box, the ring gear including a plurality of circumferentially extending slots and the mounting pins protruding through the slots, the slots and pins accommodating the limited rotational movement of the ring gear; and means for driving the ring gear to cause the limited rotational movement producing the pivotal movement of the guide vanes;

the central gear box sealing the ring gear, movement converting means, and gear driving means in a lubricated environment isolated from ambient conditions.

2. The rotary apparatus as defined in claim 1 wherein the means supporting a plurality of mounting pins in the central gear box includes an internal flange, the plurality of mounting pins extending from the internal flange to protrude through the slots in the ring gear.

3. The rotary apparatus as defined in claim 1 wherein the converting means includes a vane gear disposed internally of the gear box on a shaft supporting each of the guide vanes, the shafts extending from the gear box into the duct portion of the housing, the ring gear being disposed in engagement with the vane gears to convert rotational movement of the ring gear to pivotal movement of the guide vanes.

4. The rotary apparatus as defined in claim 1 wherein the driving means includes a worm gear in engagement with the ring gear, the ring gear having a first set of gear teeth in engagement with corresponding gear teeth on the worm gear and including a second set of gear teeth for engagement with corresponding gear teeth on a vane gear carried by a shaft supporting each of the guide vanes, the vane gears comprising the means for converting limited rotational movement of the ring gear to pivotal movement of the guide vanes.

5. The rotary apparatus as defined in claim 1 wherein the guide vanes are each journaled into the gear box on a vane supporting shaft, the guide vanes extending radially from the respective shafts in a direction generally downstream of the inlet plenum and being pivotable into the fluid flow path to vary the cross sectional area of the duct portion, and including a fixed strut extending across the duct portion immediately upstream of each of the vane supporting shafts.

6. An integrated inlet guide vane assembly for controllably varying the fluid mass flow rate past compressor blades, comprising:

a central gear box adjacent the compressor housing, the gear box having a ring gear mounted for limited rotational movement;

a plurality of guide vanes disposed in the compressor housing, the guide vanes each being mounted for pivotal movement responsive to rotational movement of the ring gear;

means for converting rotational movement of the ring gear to pivotal movement of the guide vanes, the converting means being disposed entirely within the gear box;

means supporting a plurality of mounting pins in the central gear box, the ring gear including a plurality of circumferentially extending slots and the mounting pins protruding through the slots, the slots and pins accommodating the limited rotational movement of the ring gear; and means for driving the ring gear to cause the limited rotational movement producing the pivotal movement of the guide vanes, the driving means also being disposed entirely within the gear box;

the central gear box sealing the ring gear, converting means, and driving means in a lubricated environment isolated from ambient conditions.

7. The guide vane assembly as defined in claim 6 wherein the means supporting a plurality of mounting pins in the central gear box includes an internal flange, the plurality of mounting pins extending from the internal flange to protrude through the slots in the ring gear.

8. The guide vane assembly as defined in claim 7 wherein the converting means includes a vane gear disposed internally of the gear box on a shaft supporting each of the guide vanes, the shafts extending from the gear box into the compressor housing, the ring gear being disposed in engagement with the vane gears to convert rotational movement of the ring gear to pivotal movement of the guide vanes.

9. The guide vane assembly as defined in claim 8 wherein the driving means includes a worm gear in engagement with the ring gear, the ring gear having a first set of gear teeth in engagement with corresponding gear teeth on the worm gear, the ring gear having a second set of gear teeth for engagement with corresponding gear teeth on the vane gear carried by the shaft supporting each of the guide vanes.

10. The guide vane assembly as defined in claim 6 wherein the guide vanes are each journaled into the gear box on the vane supporting shaft, the guide vanes extending radially from the respective shafts in a direction generally downstream toward the compressor blades and being pivotable into the path of fluid flow to vary the fluid mass flow rate, and including a fixed strut extending generally parallel to each of the vane supporting shafts immediately upstream thereof.

11. An auxiliary power unit operable at least in part by compressing fluid in an annular compressor housing wherein a plurality of compressor blades are mounted on a rotating hub, comprising:

an annular combustor for driving turbine blades to impart rotational movement to a shaft, the housing having an annular duct portion extending upstream of the compressor blades to an annular inlet plenum, the duct portion defining at least a portion of a compressible fluid flow path extending to the combustor;

an annular inlet guide vane assembly for controllably varying the fluid mass flow rate past the compressor blades and to the combustor, the guide vane assembly including an annular gear box adjacent the compressor housing, the gear box having a ring gear mounted for limited rotational movement, the guide vane assembly also including a plurality of guide vanes disposed in the duct portion of the housing, the guide vanes each being mounted on a shaft for pivotal movement responsive to rotational movement of the ring gear, the guide vane assembly further including means for converting rotational movement of the ring gear to pivotal movement of the guide vanes;

means supporting a plurality of mounting pins in the central gear box, the ring gear including a plurality of circumferentially extending slots and the mounting pins protruding through the slots, the slots and pins accommodating the limited rotational movement of the ring gear; and means for driving the ring gear to cause the limited rotational movement producing the pivotal movement of the guide vanes;

the gear box sealing the ring gear, movement converting means, and gear driving means in a lubricated environment isolated from ambient conditions.

12. The auxiliary power unit as defined in claim 11 wherein the means supporting a plurality of mounting pins in the gear box includes an annular internal flange, the plurality of mounting pins extending from the flange to protrude through the slots in the ring gear.

13. The auxiliary power unit as defined in claim 12 wherein the converting means includes a vane gear disposed internally of the gear box on the shaft supporting each of the guide vanes, the shafts extending from the gear box into the duct portion of the housing, the ring gear being disposed in engagement with the vane gears to convert rotational movement of the ring gear to pivotal movement of the guide vanes.

14. The auxiliary power unit as defined in claim 13 wherein the driving means includes an axially extending worm gear in engagement with the ring gear, the ring gear having a first set of gear teeth in engagement with corresponding gear teeth on the worm gear and including a second set of gear teeth for engagement with corresponding gear teeth on the vane gear carried by the shaft supporting each of the guide vanes, the vane gears comprising the means for converting limited rotational movement of the ring gear to pivotal movement of the guide vanes.

15. The auxiliary power unit as defined in claim 11 wherein the guide vanes are each journaled into the gear box on the vane supporting shaft, the guide vanes extending radially from the respective shafts in a direction generally downstream of the inlet plenum and being pivotable into the fluid flow path to vary the cross sectional area of the duct portion, and including a fixed strut extending across the duct portion immediately upstream of each of the vane supporting shafts.

* * * * *